United States Patent
Liu et al.

(10) Patent No.: US 11,413,680 B2
(45) Date of Patent: Aug. 16, 2022

(54) RIVETING TOOL ACCESSORY AND RIVETING TOOL

(71) Applicant: Hangzhou Lianwei Technology Co., Ltd., Zhejiang (CN)

(72) Inventors: Fengli Liu, Zhejiang (CN); Fuhua Qiu, Zhejiang (CN); Xiangteng Yao, Zhejiang (CN); Yong Guo, Zhejiang (CN); Lingyun Yang, Zhejiang (CN)

(73) Assignee: HANGZHOU LIANWEI TECHNOLOGY CO., LTD., Zhejiang (CN)

( * ) Notice: Subject to any disclaimer, the term of this patent is extended or adjusted under 35 U.S.C. 154(b) by 295 days.

(21) Appl. No.: 16/490,882

(22) PCT Filed: Feb. 24, 2018

(86) PCT No.: PCT/CN2018/077117
§ 371 (c)(1),
(2) Date: Oct. 23, 2019

(87) PCT Pub. No.: WO2018/157764
PCT Pub. Date: Sep. 7, 2018

(65) Prior Publication Data
US 2020/0139426 A1   May 7, 2020

(30) Foreign Application Priority Data
Mar. 2, 2017 (CN) .......................... 201710121912.8

(51) Int. Cl.
*B21J 15/38* (2006.01)
*B21J 15/26* (2006.01)

(52) U.S. Cl.
CPC .............. *B21J 15/383* (2013.01); *B21J 15/26* (2013.01)

(58) Field of Classification Search
CPC .. B21J 15/26; B21J 15/383; B21J 15/04; B21J 15/105; B21J 15/16; B21J 15/20; F16B 37/062; F16B 37/067
(Continued)

(56) References Cited

U.S. PATENT DOCUMENTS 3,626,745 A * 12/1971 Richardson .............. B21J 15/26
  29/243.526
7,908,963 B2 * 3/2011 Frenken ................... B21J 15/20
  100/269.01

* cited by examiner

*Primary Examiner* — Jessica Cahill
*Assistant Examiner* — Smith Oberto Bapthelus
(74) *Attorney, Agent, or Firm* — Hamre, Schumann, Mueller & Larson, P.C.

(57) ABSTRACT

A riveting tool accessory includes a cylinder handgrip. A rotating member and a transmission member are disposed in the cylinder handgrip. The rotating member is axially positioned and connected to the cylinder handgrip. The transmission member is circumferentially positioned and connected to the cylinder handgrip. When the rotating member rotates forwards or backwards, the transmission member is driven to move backwards or forwards. A front end of the transmission member is provided with a connecting member. A front end of the cylinder handgrip is provided with a guide nozzle assembly. The connecting member is disposed in the guide nozzle assembly in a penetrating manner. A front end of the connecting member can reach out of the guide nozzle assembly. A spring is disposed between the transmission member and the guide nozzle assembly. A safety valve mechanism is disposed between the transmission member and the connecting member.

11 Claims, 3 Drawing Sheets

(58) Field of Classification Search
USPC .................................................... 72/466.4
See application file for complete search history.

RIVETING TOOL ACCESSORY AND RIVETING TOOL

TECHNICAL FIELD

The invention belongs to the technical field of machinery and relates to a riveting tool, in particular to a riveting tool accessory and a riveting tool.

BACKGROUND TECHNIQUE

Riveting fasteners are widely used in aerospace, military, automotive, marine, construction, installation, manufacturing and other industries with requirements for riveting and fastening, and they are also widely used in civilian use, therefore the annual demand for various riveting tools is huge in relevant industries and domestic and foreign civilian markets. Riveting tools are developed to be more cost-effective, precise, convenient, efficient, and labor-saving. In order to improve the laboriousness, cumbersomeness and inefficiency of manual riveting tools, the integral pneumatic riveting tools have been developed and popularized. Pneumatic riveting tools are mainly used in the industrial market. Due to the limitation of compressed air source and high price, the market expansion of pneumatic riveting tools is hindered. With its portability and easier access to power source, the integral electric riveting tool has recently attracted wide market attention. However, there are not many products available in the domestic and foreign markets. Because the product has a high unit price due to its complex structure, it is mainly for industry market.

In recent years, it has become widely used to turn riveting tools into rotating tool holders adapted to general power output devices. Since the rotating tool device adapted thereto having power output thereto is common tools, such as drills, etc., the riveting tool holder is a valuable, meaningful and market-oriented development direction, which has emerged as a new type of riveting tool product (see JP3993844 and U.S. Ser. No. 00/601,8978).

SUMMARY OF THE INVENTION

Regarding the above-mentioned problem, the object of the present invention is to provide a riveting tool accessory with a reasonable structure design. The accessory can be adapted to driving devices with power output and can perform screw pair conversion before riveting fastener is under the force of pull-rivet.

Another object of the present invention is to provide a riveting tool with a reasonable structure, which is capable of performing screw pair conversion before riveting fastener is under the force of pull-rivet.

In order to achieve the above object, the present invention adopts the following technical solutions: the present riveting tool accessory, comprising a cylindrical handle, which is provided with a rotating part through the cylindrical handle, the rotating part is positioned axially and rotatably circumferentially connected to the cylindrical handle; and a transmission part that is circumferentially positioned and axially movably connected to the cylindrical handle, wherein the rotating part and the transmission part are connected by a threaded structure, and when the rotating part rotates forward or reverse, the transmission part can be driven to retreat or advance, wherein: the front end of the transmission part is provided with a connecting part, the front end of the connecting part can be mounted with a riveting fastener, the front end of the cylindrical handle is provided with a guiding nozzle assembly, the connecting part is disposed through the guiding nozzle assembly and the front end of the connecting part can extend out of the guiding nozzle assembly, a compression preloading spring is disposed between the transmission part and the guiding nozzle assembly, a safety valve mechanism is disposed between the transmission part and the connecting part, and the safety valve mechanism enables the screw pair conversion of the threaded structure to occur before the riveted fastener mounted on the front end of the connect part contact the guiding nozzle assembly.

In the above riveting tool accessory, the rotating part is a screw, the transmission part is a cylinder, and the front end of the screw and the rear end of the cylinder can be connected by the threaded structure; the safety valve mechanism comprises a valve core, the valve core is arranged in the cylinder and acted as a block in the middle of the cylinder, and a spring arranged between the valve core and the connect part, the spring acts on the connect part on one end and acts on the valve core on the other end, a valve cavity is formed between the screw, the cylinder and the valve core, the volume of the valve cavity can change according to the axial relative position of the screw and the cylinder to change the pressure inside, the valve cavity is provided with a medium, and the medium is a gas or a fluid.

As another solution, in the above riveting tool accessory, the rotating part has a screw hole, the transmission part has a threaded post, and the screw hole and the threaded post can be screwed; the safety valve mechanism comprises an axial through hole disposed on the transmission part and a valve core disposed in the axial through hole and acted as a block in the middle of the axial through hole, wherein a spring is disposed between the valve core and the connecting part, the spring acts on the connecting part on one end and acts on the valve core on the other end, and a valve cavity is formed between the rotating part, the transmission part and the valve core, the volume of the valve cavity can change according to the axial relative position of the rotating part and the transmission part to change the pressure inside, the valve cavity is provided with a medium, and the medium is a gas or a fluid.

In the above riveting tool accessory, the safety valve mechanism is a pressure adjustable safety valve mechanism or a fixed pressure safety valve mechanism, and if the safety valve mechanism is a fixed pressure safety valve mechanism, the safety valve mechanism is provided with an adjusting structure capable of adjusting the compression degree of the spring and/or the safety valve mechanism is provided a spring replacement structure capable of replacing different spring with different specifications.

In the above riveting tool accessory, the adjustment structure comprises an adjusting screw provided in the cylinder or the axial through hole and close to one end of the connecting part, the spring acts on the adjusting screw on one end and acts on the valve core on the other end. In the above riveting tool accessory, the rear end of the connecting part is detachably fixed to the transmission part, and the front end of the connecting part is disposed through the guiding nozzle assembly and can extend outside the guiding nozzle assembly.

In the above riveting tool accessory, the guiding nozzle assembly comprises a front outer sleeve and a cylindrical guiding nozzle detachably fixed to the front end of the front outer sleeve, and the front end of the connecting part is disposed through the guiding nozzle assembly, and the rear end of the front outer sleeve is connected with the front end of the cylindrical handle through a locking connection structure.

In the above riveting tool accessory, the locking connection structure comprises a threaded connection structure provided between the front end of the cylindrical handle and the rear end of the front outer sleeve, and a locking sleeve is screwed onto the front outer sleeve and the locking sleeve abuts against the front end surface of the cylindrical handle; the compression preloading spring acts on the front outer sleeve (61) on one end and acts on the transmission part on the other end.

In the above riveting tool accessory, the safety valve mechanism is a one-way safety valve mechanism, and when the pressure in the valve cavity is greater than the preloading force of the spring, the valve core can be pushed open to relieve pressure; or the safety valve mechanism is a two-way safety valve mechanism, and a low-pressure overload protection safety valve is provided on the safety valve mechanism, and the low-pressure overload protection safety valve is capable of increasing the pressure when the pressure in the valve cavity is less than a set value, and push the valve core open to relieve pressure when the pressure in the valve cavity is greater than the preloading force of the spring.

In the above riveting tool accessory, the cylindrical handle is provided with an annular groove in the rear end, and an elastic sleeve ring is provided in the annular groove, the rear end surface of the cylindrical handle is provided with at least one avoidance observation notch.

A riveting tool using the above riveting tool accessory is characterized by comprising a driving device, the riveting tool accessory is connectable to the driving device, and a power output shaft of the driving device is connected to the rotating part, the driving device is an electric drive or a manual drive.

The present riveting tool accessory and riveting tool is advantageous in that: the structure is reasonable and can be adapted to the drive devices with power output and can perform screw pair conversion before riveting fastener is under the force of pull-rivet. In addition, it is also possible to easily adjust the preload force of the spring as needed to increase the flexibility of use.

In the figures, cylindrical handle 1, annular groove 11, elastic ring 12, avoidance observation notch 13, riveting fastener 100, rotating part 2, transmission part 3, axial through hole 31, threaded structure 4, connecting part 5, connecting portion 51, loading screw 52, guiding nozzle assembly 6, front outer sleeve 61, cylindrical guiding nozzle 62, compression preload spring 7, safety valve mechanism 8, valve core 81, spring 82, valve cavity 83, adjusting screw 84, low pressure overload protection safety valve 85, locking sleeve 9.

DETAILED DESCRIPTION OF THE INVENTION

Figure 1:
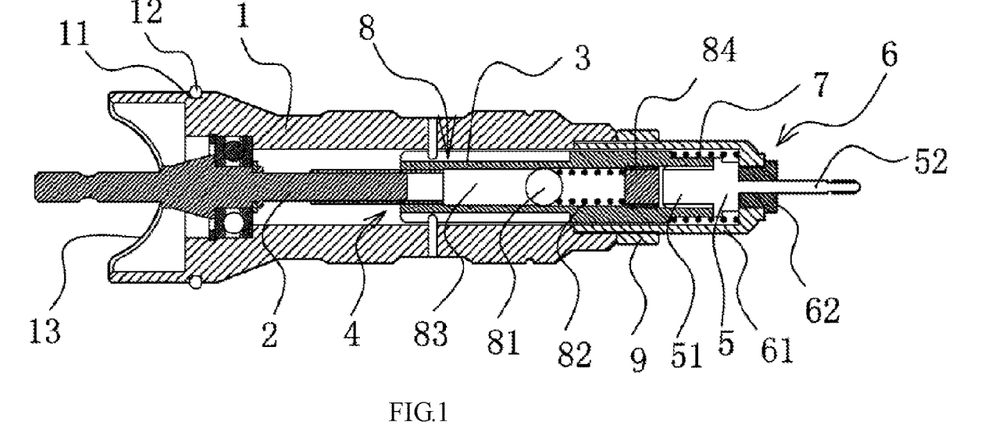
FIG. 1 is a schematic view showing the structure according to the present invention.
Figure 2:
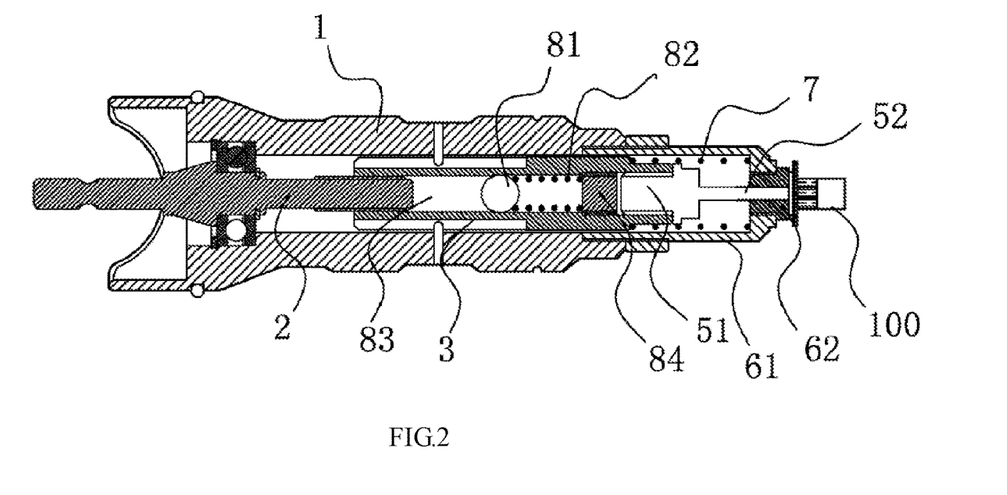
FIG. 2 is a structural schematic view showing the pull-rivet state according to the present invention.
Figure 3:
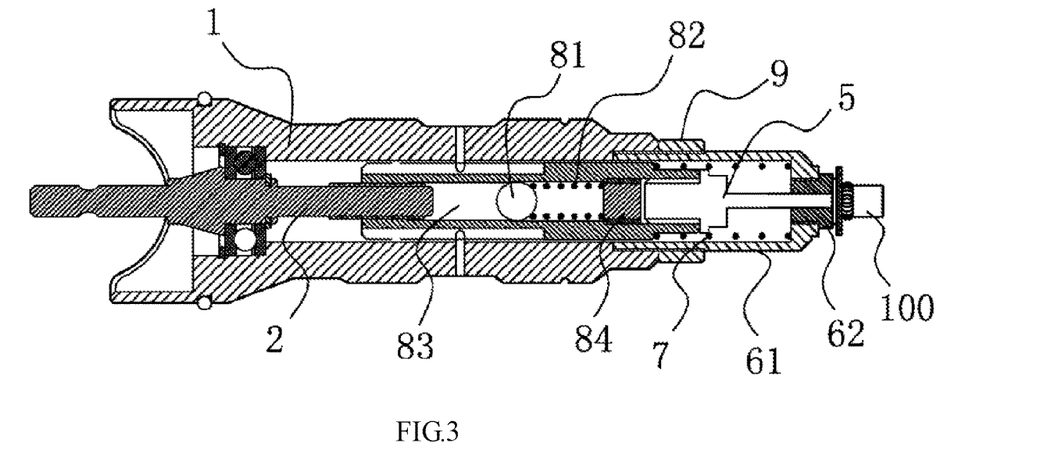
FIG. 3 is a structural schematic view showing the pull-rivet state completes according to the present invention.
Figure 4:
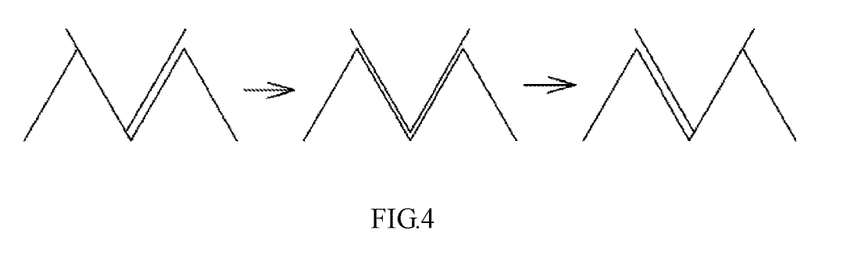
FIG. 4 is a diagram showing the screw pair conversion according to the present invention.

As shown in FIGS. 1-3, the riveting tool accessory comprises a cylindrical handle 1, which is provided with a rotating part 2 through the cylindrical handle 1, the rotating part 2 is positioned axially and rotatably circumferentially connected to the cylindrical handle 1; and a transmission part 3 that is circumferentially positioned and axially movably connected to the cylindrical handle 1, wherein the rotating part 2 and the transmission part 3 are connected by a threaded structure 4, and when the rotating part 2 rotates forward or reverse, the transmission part 3 can be driven to retreat or advance. The front end of the transmission part 3 is provided with a connecting part 5, the front end of the connecting part 5 can be mounted with a riveting fastener 100, the front end of the cylindrical handle 1 is provided with a guiding nozzle assembly 6, the connecting part 5 is disposed through the guiding nozzle assembly 6 and the front end of the connecting part 5 can extend out of the guiding nozzle assembly 6, a compression preloading spring 7 is disposed between the transmission part 3 and the guiding nozzle assembly 6, a safety valve mechanism 8 is disposed between the transmission part 3 and the connecting part 5, and the safety valve mechanism 8 enables the screw pair conversion of the threaded structure 4 to occur before the riveted fastener 100 mounted on the front end of the connect part 5 contact the guiding nozzle assembly 6. FIG. 4 is a diagram showing the screw pair conversion according to the present invention. The left shows the first crew pair contact, the middle shows the period during the screw pair conversion and the right shows the second screw pair contact.

Figure 5:
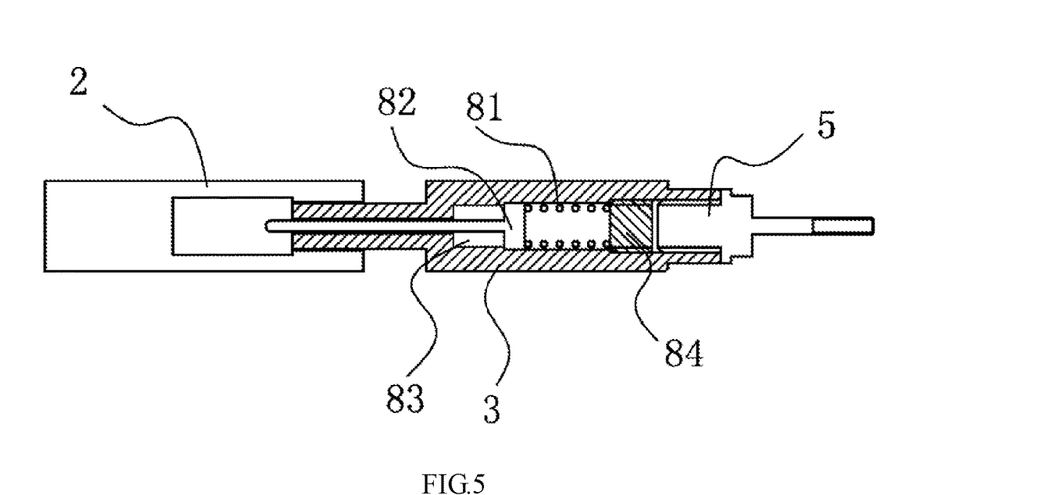
FIG. 5 is a structural schematic view showing the safety valve mechanism according to another embodiment of the present invention.

The rotating part 2 is a screw, the transmission part 3 is a cylinder, and the front end of the screw and the rear end of the cylinder can be connected by the threaded structure 4; the safety valve mechanism 8 comprises a valve core 81, the valve core 81 is arranged in the cylinder and acted as a block in the middle of the cylinder, and a spring 82 arranged between the valve core 81 and the connect part 5, the spring 82 acts on the connect part 5 on one end and acts on the valve core 81 on the other end, a valve cavity 83 is formed between the screw, the cylinder and the valve core 81, the volume of the valve cavity 83 can change according to the axial relative position of the screw and the cylinder to change the pressure inside, the valve cavity 83 is provided with a medium, and the medium is a gas or a fluid. As an alternative solution, as shown in FIG. 5, the rotating part 2 has a screw hole, the transmission part 3 has a threaded post, and the screw hole and the threaded post can be screwed; the safety valve mechanism 8 comprises an axial through hole 31 disposed on the transmission part 3 and a valve core 81 disposed in the axial through hole 31 and acted as a block in the middle of the axial through hole 31, wherein a spring 82 is disposed between the valve core 81 and the connecting part 5, the spring 82 acts on the connecting part 5 on one end and acts on the valve core 81 on the other end, and a valve cavity 83 is formed between the rotating part 2, the transmission part 3 and the valve core 81, the volume of the valve cavity 83 can change according to the axial relative position of the rotating part 2 and the transmission part 3 to change the pressure inside, the valve cavity 83 is provided with a medium, and the medium is a gas or a fluid. Obviously, if there is a loop system, the medium in the valve cavity 83 can also be other types of medium.

To make the valve core 81 act as a block in the middle of the cylinder or the axial through hole 31, an annular step is formed in the cylinder or the axial through hole as a valve seat for the valve core 81. Taking into account cost, heat dissipation, stiffness, correct opening of the valve, returning to the seat and its performance requirements, the valve core 81 can adopt a rigid or elastic sphere, a hemisphere or the like, or other cylinders and sleeves without a pressure outlet structure, or any flat plates, sleeves and cylinders having a different surface structure on its upper surface in the present invention. By doing so, when there is external force or the medium pressure inside the valve cavity 83 is greater than the pressure applied to the valve core 81 by the compression preload of the compression pre-loading spring 82, automatic opening and closing action can be performed.

The safety valve mechanism 8 is a pressure adjustable safety valve mechanism or a fixed pressure safety valve mechanism, and if the safety valve mechanism is a fixed pressure safety valve mechanism, the safety valve mechanism is provided with an adjusting structure capable of adjusting the compression degree of the spring and/or the safety valve mechanism is provided a spring replacement structure capable of replacing different spring with different specifications. Specifically, the adjustment structure comprises an adjusting screw 84 provided in the cylinder or the axial through hole 31 and close to one end of the connecting part 5, the spring 82 acts on the adjusting screw 84 on one end and acts on the valve core 81 on the other end. Further, the safety valve mechanism 8 is a one-way safety valve mechanism, and when the pressure in the valve cavity 83 is greater than the pre-loading force of the spring 82, the valve core 81 can be pushed open to relieve pressure; or the safety valve mechanism 8 is a two-way safety valve mechanism, and a low-pressure overload protection safety valve 85 is provided on the safety valve mechanism 8, and the low-pressure overload protection safety valve 85 is capable of increasing the pressure when the pressure in the valve cavity 83 is less than a set value, and push the valve core 81 open to relieve pressure when the pressure in the valve cavity 83 is greater than the preloading force of the spring 82.

Figure 6:
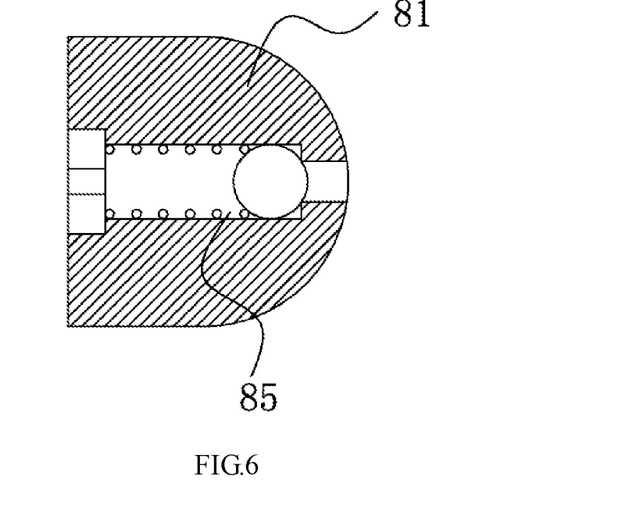
FIG. 6 is a schematic structural view of a portion of the two-way safety valve according to the present invention.

In order to facilitate understanding of the different types of safety valve mechanisms 8, various types of safety valve mechanisms 8 are further described below: the safety valve mechanism 8 is a device for thresholding the working pressure of the medium in the valve cavity 83. The medium pressure in the valve cavity 83 is mainly derived from the change of the medium temperature, the increase or decrease of the medium in the volume of the valve cavity 83, or the volume/temperature changes caused by pressuring/decompressing device working on quantitative medium in the volume of the closed valve cavity 83. The one-way spring pre-loading safety valve mechanism 8 is a type of safety valve. The one-way spring pre-loading safety valve mechanism utilizes the force of the compression spring to balance the force exerted by the medium on the valve core 81. The maximum allowable pressure threshold of the safety valve mechanism is determined by the preloading compression of the spring. When the force of the medium in the valve cavity 83 on the valve core 81 is less than the force of the pre-pressure spring 82 on the valve core 81, the valve core 81 is in a closed state; when the force of the medium in the valve cavity 83 on the valve core 81 is greater than the force of the pre-pressure spring 82 on the valve core 81, the spring 82 is compressed to cause the valve core 81 to leave the valve seat, and the valve is automatically opened; when the force of the medium in the valve cavity 83 on the valve core 81 is less than the pre-loading force of the spring 82, the pressure of the spring 82 pushes the valve core 81 back to the valve seat, and the valve is automatically closed. According to the different direction of the force of the spring 82 to the valve core 81, the spring preloading safety valve mechanism can be divided into a low-pressure protection safety valve and a high-pressure protection safety valve. Since the force of the spring 82 on the valve core 81 is one-way, such spring preload safety valve mechanisms can be collectively referred to one-way safety valves. When the spring 82 is embedded outside the valve cavity 83 of the safety valve, the function of the safety valve mechanism is high-voltage overload protection; when the pre-pressure spring is embedded in the safety valve cavity 83, and the pressure overload protection means the low-voltage overload protection. Typically, the safety valve core has a passage connected to the pressure outlet on the side of the preload. According to the pre-loading spring embedded position, the pre-loading pressure type safety valve can be divided into a low-pressure protection safety valve and a high-pressure protection safety valve, but only functions as a one-way pressure overload protection. The safety valve can be divided into a pressure-adjustable safety valve and a fixed-pressure safety valve according to whether the compression amount of the pre-loading spring is variable. The preloaded pressure safety valve mechanism is light and compact, has high sensitivity, is unrestricted in installation position. Due to its low sensitivity to vibration, it can be used on mobile devices in addition to fixing devices or pipes. The one-way preloaded pressure safety valve is widely used as a safety device for overpressure (low pressure or high pressure) protection in various related industries. If the valve has both a low pressure and high-pressure protection, the safety valve is a two-way safety valve. In this case, the working pressure of the medium in the valve cavity connected with the two-way safety valve will be defined in a certain pressure threshold range. The valve core will close when the medium operating pressure is within the threshold range; the valve core will automatically open when the working pressure of the medium exceeds the threshold range; when the working pressure of the medium returns to the threshold range of the safety valve, the valve core will automatically return to the seat. Regarding the structural design of the two-way safety valve, there are usually directional or other specific requirements for installation. Obviously, in the present invention, the safety valve mechanism 8 can also be a two-way safety valve mechanism. The safety valve mechanism 8 is provided with a low-pressure overload protection safety valve 85 configured to increase the pressure in the valve cavity 83 when the pressure in the valve cavity 83 is less than a set value, and push the valve core 81 open to relieve pressure when the pressure in the valve cavity 83 is greater than the preload of the spring 82. If the one-way safety valve mechanism of the present invention is changed to a two-way safety valve mechanism, bidirectional (positive pressure and negative pressure) threshold settings for the medium pressure in the valve cavity can be achieved. For example, as shown in FIG. 6, a low pressure overload protection safety valve 85 is provided on the valve core 81. The working pressure of the medium in the valve cavity will be limited to the range of the positive pressure threshold and the negative pressure threshold; it can also be achieved by place a separate low pressure overload protection safety valve at other location or other components such as the side of the cylinder or the front end of the screw within the closed valve cavity; or directly replace the valve core 81 with any suitable type of two-way safety valve, and adapt the two-way safety valve and the pre-loading spring associated with this change so as to limit the working pressure of the medium in the valve cavity to the range of the positive pressure threshold and negative pressure threshold, because the valve core 81 of the safety valve mechanism is closed when the working pressure in the valve cavity is within the threshold range, so such cases are also included in the scope of protection of the present invention. In this case, the threshold range of the two-way safety valve may be unidirectionally adjustable or bidirectionally adjustable.

As shown in FIGS. 1-3, more specifically, the connecting part 5 comprises a connecting portion 51 detachably fixed to the transmission part 3, and a loading screw 52 provided at the connecting portion 51, and the loading screw 52 is disposed through the guiding nozzle assembly 6 and the front end of the loading screw 52 can extend outside the guiding nozzle assembly 6. The loading screw 52 can be coupled to a rivet fastener 100, such as a pull-rivet screw. The guiding nozzle assembly 6 comprises a front outer sleeve 61 and a cylindrical guiding nozzle 62 detachably fixed to the front end of the front outer sleeve 61, and the rear end of the front outer sleeve 61 is connected with the front end of the cylindrical handle 1 through a locking connection structure. In particular, the locking connection structure comprises a threaded connection structure provided between the front end of the cylindrical handle 1 and the rear end of the front outer sleeve 61, and a locking sleeve 9 is screwed onto the front outer sleeve 61 and the locking sleeve 9 abuts against the front end surface of the cylindrical handle 1; the compression preloading spring 7 acts on the front outer sleeve 61 on one end and acts on the transmission part 3 on the other end. The cylindrical handle 1 is provided with an annular groove 11 in the rear end, and an elastic sleeve ring 12 is provided in the annular groove 11, the rear end surface of the cylindrical handle 1 is provided with at least one avoidance observation notch 13.

The working process of the present invention is as follows:

As shown in FIG. 1, as the pull-rivet stroke starts, the loading screw 52 is in the front end limit position and is amounted with a pull-rivet nut matching the front end thread of the loading screw 52, the the safety valve mechanism 8 is in a closed state. The threaded structure 4 between the rotating part 2 and the transmission part 3 begins to enter the engaged state. Driven by the rotating part 2, the transmitting part 3 and the rotating part 2 are moved toward each other, and the medium in the valve cavity 83 is compressed, and the medium pressure is increased. Before the medium pressure in the valve cavity 83 reaches the maximum pressure threshold of the medium, the medium pressure in the valve cavity 83 varies with the relative position of the rotating part 2 and the transmission part 3, and the valve body 81 is normally closed. If the medium pressure of the compressed medium in the valve cavity 83 exceeds the maximum allowable medium pressure threshold of the valve cavity 83, the thrust of the compressed medium against the valve core 81 exceeds the preloading force of the spring 82, and the valve is automatically depressurized until the maximum allowable medium pressure threshold is obtained. The rotating part 2 and the transmission part 3 are threadedly engaged, and the rotating part 2 and the cylindrical handle 1 are connected by a thrust ball bearing to form an axial and radial limit connection. The compressed medium within the valve cavity 83 forms a preload. At the same time, as the rotating part 2 rotates, the transmission part 3 is driven to move backward, the compression amount of the compression pre-loading spring 7 is gradually reduced. The compression pre-loading spring 7 and the safety valve mechanism 8 have opposite directions of force on the screw pair.

As shown in FIG. 2, the rotation of the rotating part 2 causes the transmission part 3 to drive the loading screw 52 to move backward to the rear end surface of the pull-rivet nut to maintain a certain pressure contact with the front end surface of the cylindrical guiding nozzle 62, but the pressure is insufficient to deform the rivet nut plastically. In this case, the pre-loading rivet nut on the tool can be inserted vertically into the pre-made hole on the workpiece, and then the transmission part continues to rotate in the same direction to start loading the pull-rivet load.

As shown in FIG. 3, the pull-rivet nut is plastically deformed to a certain extent by the pull-rivet load, and the pull-rivet nut process ends when the pull-rivet nut is fastened to the workpiece.

Finally, changing the steering of the power tool causes the pull-rivet screw to follow or manually pull the pull-rivet screw out of the nut, and the pull-rivet nut process ends.

Figure 7A:
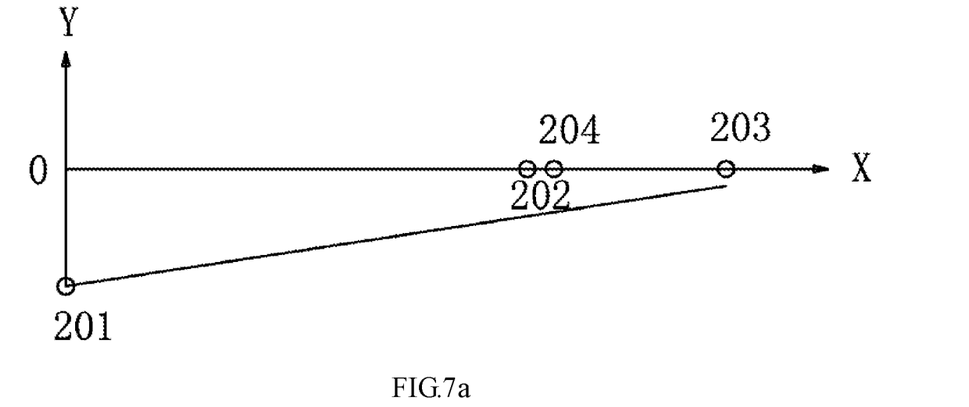
FIG. 7a is an analysis diagram showing screw pair pre-loading force and screw pair conversion position of the pull-rivet tool accessory without built-in safety valve structure during the pull-rivet stroke.
Figure 7B:
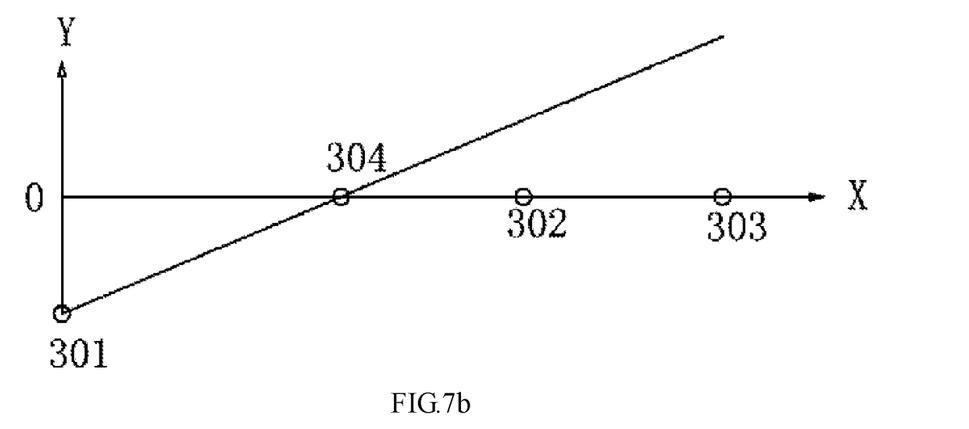
FIG. 7b is an analysis diagram showing screw pair pre-loading force and screw pair conversion position according to the present invention.

FIG. 7a and FIG. 7b are analysis diagrams showing screw pair pre-loading force and screw pair conversion position during the pull-rivet stroke according to the pull-rivet tool accessory without built-in safety valve structure and the present invention, respectively. In the figure, the X axis represents the pull-rivet stroke and the Y axis represents the preload force on the screw pair.

FIG. 7a is an analysis diagram showing screw pair pre-loading force and screw pair conversion position of the pull-rivet tool accessory without built-in safety valve structure during the pull-rivet stroke.

201—the starting point of pull-rivet stroke of the pull-rivet tool accessory without built-in safety valve structure;

202—the starting point of nut pull-rivet of the pull-rivet tool accessory without built-in safety valve structure;

203—the completion point of nut pull-rivet of the pull-rivet tool accessory without built-in safety valve structure;

204—the completion point of the screw pair conversion of the pull-rivet tool accessory without built-in safety valve structure.

The pre-loading force at the starting point 201 of pull-rivet stroke of the pull-rivet tool accessory without built-in safety valve structure is applied by the pre-loading compression spring 7 to solve the problem of thread re-entry, but the screw pair is still exiting screw pair. At the starting point 202 of nut pull-rivet, the power tool starts to load, but at this time, it is necessary to overcome the pre-loading force on the exiting screw pair to convert the screw pair to the pull-rivet screw pair, and the screw transmission mechanism can start to convert the torque loaded by the power tool to the pull-rivet load on the pull-rivet nut, so the screw pair conversion completion point 204 is located after the nut pull-rivet starting point 202. The distance between point 202 and point 204 is the inter-thread clearance, and the thread wear increases the inter-thread clearance.

FIG. 7b is an analysis diagram showing screw pair pre-loading force and screw pair conversion position according to the present invention.

301—the starting point of pull-rivet stroke of the present invention;

302—the starting point of nut pull-rivet of the present invention;

303—the completion point of nut pull-rivet of the present invention;

304—the completion point of the screw pair conversion of the present invention.

The pre-loading force of the starting point 301 of pull-rivet stroke of the present invention is also applied by the pre-loading compression spring 7 to solve the problem of thread re-entry, but the screw pair is also exiting the screw pair. Before the starting point 302 of nut pull-rivet, the power tool rotates to pressurize the safety valve, the safety valve begins to intervene in the movement of the thread transmission mechanism, and the medium pressure in the valve cavity of the safety valve exerts an axial preloading force on the screw pair, but the direction is opposite with the pre-loading force applied by the pre-loading compression spring 7, but when the combined force of these two pre-loading forces from two directions is 0, the screw pair starts to converse, so in the present invention the screw pair conversion completion point 304 is located before the starting point 302 of nut pull-rivet. Because the screw pair has been converted from the exiting screw pair to the pull-rivet screw pair and pre-loaded at the starting point 302 of nut pull-rivet, the power tool can directly load the pull-rivet load on the pull-rivet nut through the screw transmission mechanism.

A riveting tool using the riveting tool accessory, wherein: comprising a driving device, the riveting tool accessory is connectable to the driving device, and a power output shaft of the driving device is connected to the rotating part, the driving device is an electric drive or a manual drive.

The specific embodiments described herein are merely illustrative of the spirit of the invention. Those skilled in the art of the present invention can make various modifications or additions, or a similar alternative embodiment to the specific embodiments described, but without departing from the spirit of the present invention or the defined scope of the appended claims.

Although more commonly used herein, the terms such as cylindrical handle 1, annular groove 11, elastic ring 12, avoidance observation notch 13, riveting fastener 100, rotating part 2, transmission part 3, axial through hole 31, threaded structure 4, connecting part 5, connecting portion 51, loading screw 52, guiding nozzle assembly 6, front outer sleeve 61, cylindrical guiding nozzle 62, compression pre-loading spring 7, safety valve mechanism 8, valve core 81, spring 82, valve cavity 83, adjusting screw 84, low-voltage overload protection safety valve 85, locking sleeve 9, etc., do not preclude the possibility of using other terms. These terms are only used to describe and explain nature of invention more conveniently; it is to be construed that any additional limitation is inconsistent with spirit of invention.

The invention claimed is:

1. A riveting tool accessory, comprising;
a cylindrical handle, which is provided with a rotating part through the cylindrical handle, the rotating part is positioned axially and rotatably circumferentially connected to the cylindrical handle; and
a transmission part that is circumferentially positioned and axially movably connected to the cylindrical handle,
wherein the rotating part and the transmission part are connected by a threaded structure, and when the rotating part, rotates forward or reverse, the transmission part is configured to he driven to retreat or advance,
the rotating part is a screw, the transmission part is a cylinder, a front end of the screw is surrounded by and disposed inside the threaded structure, a front end of the threaded structure is surrounded by and disposed inside the cylinder;
wherein a front end of the transmission part is provided with a connecting part, a front end of the connecting part is configured to be mounted with a riveting fastener,
a rear end of the connecting part is disposed within the transmission part,
a front end of the cylindrical handle is provided with a guiding nozzle assembly, the connecting part is disposed through the guiding nozzle assembly and the front end of the connecting part is configured to extend out of the guiding nozzle assembly,
a compression preloading spring is disposed between. the transmission part and the guiding nozzle assembly,
a safety valve mechanism is disposed between the transmission part and the connecting part,
the safety valve mechanism includes a spring, a valve core contacting the spring, and a valve cavity,
the valve core is disposed between the spring and the valve cavity, a diameter of the valve core is the same as a diameter of the spring and a diameter of the valve cavity in a cross-sectional view,
the valve cavity is disposed inside the transmission part and is tangent to the threaded structure.

2. The riveting tool accessory in accordance with claim 1, wherein:
the valve core is arranged in the cylinder and acted as a block in a middle of the cylinder,
all the spring is arranged between the valve core and the connecting part, the spring acts on the connecting part on one end and acts on the valve core on another end,
the valve cavity is formed between the screw, the cylinder and the valve core, the volume of the valve cavity is configured to change according to an axial relative position of the screw and the cylinder to change a pressure inside, the valve cavity is provided with a medium, and the medium is a gas or a fluid.

3. The riveting tool accessory in accordance with claim 2, wherein:
the safety valve mechanism is a pressure adjustable safety valve mechanism or a fixed pressure safety valve mechanism, and
if the safety valve mechanism is a fixed pressure safety valve mechanism, the safety valve mechanism is provided with an adjusting structure configured to adjust the compression degree of the spring and/or the safety valve mechanism is provided a spring replacement structure.

4. The riveting tool accessory in accordance with claim 3, wherein:
the adjusting structure comprises an adjusting screw provided in the cylinder or the axial through hole and disposed between the spring and one end of the connecting part,
the spring acts on the adjusting screw on one end and acts on the valve core on the other end.

5. The riveting tool accessory in accordance with claim 4, wherein: the connecting part comprises:
a connecting portion detachably fixed to the transmission part, and
a loading screw provided at the connecting portion, and the loading screw is disposed through the guiding nozzle assembly and the front end of the loading screw is configured to extend outside the guiding nozzle assembly.

6. The riveting toot accessory in accordance with claim 5, wherein:
the guiding nozzle assembly comprises:
a front outer sleeve and a cylindrical guiding nozzle detachably fixed to front end of the front outer sleeve, and a rear end of the front outer sleeve is connected with the front end of the cylindrical handle through a locking connection structure.

7. The riveting tool accessory in accordance with claim 5, wherein:
a locking connection structure comprises:
a threaded connection structure provided between the front end of the cylindrical handle and the rear end of the front outer sleeve, and a locking sleeve is screwed onto the front outer sleeve and the locking sleeve abuts against the front end surface of the cylindrical handle; the compression preloading spring acts on the front outer sleeve on one end and acts on the transmission part on the other end.

8. The riveting tool accessory in accordance with claim 2, wherein:
the safety valve mechanism is a one-way safety valve mechanism, and when the pressure in the valve cavity is greater than a pre-loading force of the spring, the valve core is configured to be pushed open to relieve pressure; or
the safety valve mechanism is a two-way safety valve mechanism, and an overload protection safety valve is provided on the safety valve mechanism, and the overload protection safety valve is configured to increase the pressure when the pressure in the valve cavity is less than a set value, and push the valve core open to relieve pressure when the pressure in the valve cavity is greater than the preloading force of the spring.

9. The riveting tool accessory in accordance with claim 2, wherein:
the cylindrical handle is provided with an annular groove surrounding an outer surface of the cylindrical handle in the rear end, and an elastic sleeve ring is provided in the annular groove, the rear end surface of the cylindrical handle is provided with at least one avoidance observation notch curved towards the transmission part.

10. The riveting tool using the riveting tool accessory in accordance with claim 1, comprising:
a driving device, the riveting tool accessory is connectable to the driving device, and a power output shaft of the driving device is connected to the rotating part, the driving device is an electric drive or a manual drive.

11. A riveting tool accessory, comprising:
cylindrical handle, which is provided with a rotating part through the cylindrical handle, the rotating part is positioned axially and rotatably circumferentially connected to the cylindrical handle; and
a transmission part that is circumferentially positioned and axially movably connected to the cylindrical handle,
wherein the rotating part and the transmission part are connected by a threaded structure, and when the rotating part rotates forward or reverse, the transmission part is configured to be driven to retreat or advance,
wherein a front end of the transmission part is provided with a connecting part, a front end of the connecting part is configured to be mounted with a riveting fastener,
a rear end of the connecting part is disposed within the transmission part,
a front end of the cylindrical handle is provided with a guiding nozzle assembly, the connecting part is disposed through the guiding nozzle assembly and the front end of the connecting part is configured to extend out of the guiding nozzle assembly,
a compression preloadin spring is disposed between the transmission part and the guiding nozzle assembly,
a safety valve mechanism is disposed between the transmission part and the connecting part,
the rotating part has a screw hole, the transmission part has a threaded post, the screw hole surrounds a rear end of the threaded post, and the screw hole and the threaded post are configured to be screwed;
the safety valve mechanism comprises:
an axial through hole disposed on the transmission part and a valve core disposed in the axial through hole and acted as a block in a middle of the axial through hole,
a diameter of the screw hole of the rotating part is the same as a diameter of the threaded post and a diameter of the axial through hole in a cross-sectional view,
wherein a spring is disposed between the valve core and the connecting part, the spring acts on the connecting part on one end and acts on the valve core on another end, and
a valve cavity is formed between the rotating part and the valve core,
a diameter of the valve core is the same as a diameter of the spring and the diameter of the axial through hole in the cross-sectional view,
the valve cavity is disposed inside the axial through hole and is tangent to the threaded post, the valve cavity is disposed between the threaded post and the valve core, the valve core is disposed between the valve cavity and the spring,
the volume of the valve cavity is configured to change according to an axial relative position of the rotating part and the transmission part to change a pressure inside, the valve cavity is provided with a medium, and the medium is a gas or a fluid.

\* \* \* \* \*